United States Patent [19]

Seeds et al.

[11] Patent Number: 5,536,522

[45] Date of Patent: Jul. 16, 1996

[54] PEAK FLAVOR PROTEIN ROUX

[75] Inventors: W. R. Seeds, Waxahachie; William A. McMinn, III, Highland Village, both of Tex.

[73] Assignee: Country Flavor, Inc., Dallas, Tex.

[21] Appl. No.: 497,651

[22] Filed: Jun. 30, 1995

Related U.S. Application Data

[63] Continuation-in-part of Ser. No. 241,498, May 12, 1994, abandoned.

[51] Int. Cl.⁶ .................................................. A23L 1/01
[52] U.S. Cl. ............................................. 426/589; 426/656
[58] Field of Search ............................... 426/589, 656

[56] References Cited

U.S. PATENT DOCUMENTS

| | | | |
|---|---|---|---|
| 4,084,016 | 4/1978 | Kon | 426/550 |
| 4,126,710 | 11/1978 | Jaworski | 426/589 |
| 4,363,824 | 12/1982 | Willi | 426/589 |
| 4,415,599 | 11/1983 | Bos | 426/578 |
| 4,492,713 | 1/1985 | Chauvin | 426/601 |
| 4,568,551 | 2/1986 | Seewi | 426/99 |
| 4,844,938 | 7/1989 | Amamoto | 426/589 |
| 5,080,921 | 1/1992 | Reimer | 426/589 |
| 5,127,953 | 7/1992 | Hamaguchi | 426/601 |
| 5,128,165 | 7/1992 | Wakana | 426/550 |
| 5,145,705 | 9/1992 | Seeds | 426/589 |
| 5,206,046 | 4/1993 | Seeds | 426/578 |
| 5,208,062 | 5/1993 | Sugisawa | 426/589 |
| 5,279,849 | 1/1994 | Fuisz | 426/658 |
| 5,364,652 | 11/1994 | Ohkuma | 426/549 |
| 5,366,749 | 11/1994 | Frazee | 426/550 |

*Primary Examiner*—Carolyn Paden
*Attorney, Agent, or Firm*—Henry Croskell

[57] ABSTRACT

Peak flavor protein rouxs having applications in food products such as gravies, sauces, soups, breadings, stuffings and as flavor carriers are produced from protein food sources such as protein concentrates from vegetable, animal, dairy, fish and foul food sources which when mixed with shortening and caramelized to a specific color yields a peak flavor roux caramelized protein. The protein roux exhibiting a peak flavor which is correlatable to a specific color is achieved as a result of mixing, heating, caramelizing and quenching of the protein food source and oil mixture upon reaching a specific color—peak flavor. In addition, a snack chip composition and a snack chip having reduced oil content is provided by utilizing the peak flavor rouxs in conjunction with power or particulate vegetable sources and processed by air baking of the chip materials resulting in a reduced oil peak flavor chip.

30 Claims, No Drawings

5,536,522

PEAK FLAVOR PROTEIN ROUX

This application is a continuation-in-part of U.S. patent application Ser. No. 08/241,498, filed May 12, 1994 now abandoned.

FIELD OF THE INVENTION

The invention relates to peak flavor protein rouxs that have application in food products such as in gravies, sauces, soups, breadings, stuffings, flavor carriers and the like.

In another aspect, the invention relates to a method for producing peak flavor protein rouxs by cooking a protein source, such as protein concentrates from vegetable, animal, dairy, fish and foul sources of food, with fats and oils under controlled conditions for producing roux.

BACKGROUND OF THE INVENTION

Presently, there are various known methods for producing roux. For example, U.S. Pat. No. 4,844,938 discloses a method for producing roux by drying flour until the moisture thereof is reduced to 0.5 to 10% by weight, adding fats and oil having a melting point of not more than 55° C. and a weight ratio of flour/fats and oils being of $1/5$ to $1/6.25$ then heating the mixture at a temperature of 65° to 130° C. for five to sixty minutes. The patent further teaches heating a similar mix in a two cycled heating process after the first cycle cooling and seasoning with processed milk products, extracts, starch and the like of from 0.3 to 4 parts by weight relative to one part by weight of total amount of mixture of dried flour and fats and oils and subjecting the result of mixture to a second heating and mixing process. A primary object of the reference is to provide a method for producing roux which makes it possible to eliminate the problems of powdery or grainy texture and raw material odor. Several of the prior art teachings provide methods for producing roux however, the roux has odor of raw materials since the ingredients are not heat treated at elevated temperatures. Moreover, such roux has a problem that it turns pasty when cooked.

In addition, U.S. Pat. No. 4,363,824 which addresses a process for the production of a food base instantaneously dispersible in water also presents as an object to provide a suitable heat treatment combined with a suitable choice of starting materials as a method for producing an instantaneously dispersible water roux or food base. The reference further addresses the issue that the required properties of roux cannot be obtained by temperature cycles. Although as normally assumed that it is only the temperature levels at which the fat is held and the holding times which are important in the heat treatments of fats, it has been found that controlled cooling is also crucial. The reference addresses a food base with a requirement of a binding effect without forming lumps when boiling water is poured onto the food base. In addition, the food base or roux is required to be storageable and not to agglutinate at room temperature.

Dry mixture compositions, which typically contain thickening agents such as starch or flour together with flavoring and coloring agents are widely used to prepare gravies and sauces. In preparing a roux from such a mix, the dry mix is dispersed in cold water and the dispersion gradually heated to boiling with constant agitation to gelatinize the starch and thereby thicken the liquid to the desired extent. This process must be carried out with care in order to avoid the formation of lumps in the thickened product. A number of procedures have been suggested in order to avoid the formation of lumps in the prepared gravies and sauces using a dry mix composition. For example, U.S. Pat. No. 4,415,599 provides an improved dry mix composition for the preparation of gravies and sauces which contains a thickening agent, such as starch and/or flour, and maltodextrin, with the maltodextrin being present in the dry mix composition in an amount sufficient to provide a weight ratio of maltodextrin to thickening agent of at least 1:1.

A roux is a basic cooking ingredient used especially in French and Creole cooking as well as in Continental and Italian cooking and more recently, heavily relied upon by various fast food preparations. Roux is used for example, as a base for making gravies, soups, sauces, etc. In general, roux is made by cooking a mixture of flour and vegetable oil or other fat based substance until the desired cooked brown mixture is reached. In classical French cooking,t he roux is made by mixing flour with melted butter. Various cookbook authorities define roux similarly for example, a generic term for various flour bindings. A roux is sometimes brown, sometimes white, according to the end use intended. If a thin sauce or gravy is required then, the amount of flour to oil is reduced. The color of the roux is gently brought to the desired shade by heating and stirring then the liquid ingredient by the recipe is added little by little and the sauce seasoned as desired and allowed to mellow. The drippings from a piece of roast meat is sometimes used instead of butter or cooking oils and fats thus, improving the flavor of the sauce if intended to be served with the roast.

Because tat is known to provide improved flavor consistency and mouth feel to foods, its use in certain food applications is highly desirable. For obvious reasons, concentrations containing a substantial proportion of fat or oil are generally not prepared in dry form. Advantageously, such concentrates are provided in tub configurations or the like similar to margarines. Although fat-containing concentrates in these forms provide a number of benefits in terms of convenience, stability and the like, their preparation generally involves expensive equipment and procedures. Heated mixtures of flour and tat used as thickeners in gravies and as sauce bases and the like are known as roux. Flour and fat are combined in suitable proportions and amounts and heated for varying periods depending upon the type of roux desired. Preparation of conventional roux is time consuming and considerable care must be taken to avoid overheating and to achieve a smooth consistency.

A number of procedures have been recently suggested in order to avoid problems experienced by the prior art and to provide for example the fast food industry improved convenience of utilizing hot or boiling water dispersible fried flavor roux base products for gravies, sauces and soups, constituted from vegetable flour and oil. For example, U.S. Pat. Nos. 5,206,046 and 5,145,705, disclose such fried flavor rouxs or roux bases having a fried flavor as a result of the method of preparation and are incorporated by reference. The flour/oil roux base product with definitive fried flavor suitable for use in soups, sauces and gravies which is storage stable in a dry form provides the food industry with an advantage over the products previously discussed. It has been found that the end user benefits if such a fried flavor roux base product having consistent flavor and roux properties can be made and supplied in dry bulk, however can be converted to gravies or sauces or liquid forms by the simple addition of hot or boiling water.

It can be seen from the improvements provided by the tried flavor roux base product requiring only hot water or boiling water to convert to gravy, sauces or soup bases a significant step forward in ease of preparation of fried flavor food products has been achieved. It would be most beneficial to the end user to also have a peak flavor protein roux base prepared from vegetable or animal protein concentrate or protein sources wherein the peak flavor is achieved by adjustment of the process, temperature, time and combination with oils resulting in a caramelized mixture which is quenched in order to halt the carmelization reaction resulting in a particularly peak flavor protein roux base which is correlatable to the roux base color.

It can also be seen from the improvements provided by the fried flavor roux based product and peak flavor protein roux based products, both of which are correlatable to the roux based color, can provide a source for food compositions capable of being mixed with other vegetable source materials to form snack chips or snack chip compositions wherein the oil is reduced in the roux content before mixing with a vegetable source resulting in a reduced oil snack chip having definitive peak flavors.

SUMMARY OF THE INVENTION

The food preparation industry continues to need less cumbersome cooking procedures and less costly additives for flavor essence and the like which can vary substantially from mix to mix. It is just as important to develop a new and improved protein enriched roux which can supply a variety of flavor peaks depending on the protein source. In addition, the variation of peak flavor protein roux base provides the industry with an enriched protein food source having the capacity of providing adjustable flavor.

Accordingly, it is an object of the present invention to provide a peak flavor protein roux base or flavor carrier base composition wherein the flavor essentially of the protein roux base is identifiable by color tone and yet the protein roux base is capable of providing sauces and gravies and the like which are pleasant to the palate with definitive peak flavors. It is another object of the present invention to provide a peak flavor protein roux base which can be presented to the consumer in the forms of soups, gravies and the like which is a source of protein concentrate which are necessary for growth and maintenance of body weight. Yet another object of the present invention is to provide the consumer with peak flavor protein roux base which can be tailor-made for supplying protein concentrate to dietetic needs, for example, vegetarian diets requiring protein supplement by combining vegetable protein group sources.

The present invention has been completed on the basis of the finding that the aforementioned problems associated with conventional methods for production of roux and the roux base product can effectively be solved by producing protein based rouxs having peak flavors which adjusts the flavor intensity through a combination of heating, timing and quenching. The heating of a mixture of a predried protein enriched source or protein source are equivalent product with a liquified shortening wherein the mixture has a ratio of from about 80:20 to 20:80 percent by weight of protein source to shortening. During heating, the mixture is continuously stirred for a period of about 2 minutes up to 20–30 minutes or more while the temperature of the mixture is being elevated through various stages of carmelization, producing corresponding color changes. These color changes occur more rapidly as the temperature of the mixture increases. At the appropriate temperature and time combination, the caramelizing mixture is quenched in order to halt the caramelization reaction resulting in a particular peak flavor protein roux base or flavor carrier which is correlated to the roux base, flavor carrier color.

In the development of selected flavor protein roux base products, and the resulting gravies, sauces and flavor carriers produced by application of these products, especially in microwave applications, it is necessary to have specific flavors prior to microwave preparation. In public food preparation services as well as in the home, the need for uniform consistent products that do not vary batch to batch is paramount, especially if the roux base product is prepared with a specific flavor essence or taste. According to the invention, the individual peak flavor protein roux base products can be produced with varying taste by variation of the time and temperature of the process. Thus providing different flavor profiles for a specific protein source-shortening combination. For example, the use of a dairy protein source can culminate into a fried cheese flavor which can vary in intensity as well as accentuating the fried egg taste of whole egg powder protein source as well as providing a concentrated fried chicken or roasted meat paste on meat protein sources. Definitive flavor protein roux base according to the invention can be the result of two or more different production cycles which can be blended to develop a roux base product of a specific flavor or the mixture of various rouxs produced from various protein sources. In addition the process can be set up to develop a definitive flavor which is identifiable by the peak flavor protein roux base color.

The present invention deals with the food chemistry of roux base preparations and flavor carrier preparations wherein the utilization of protein sources and enriched protein sources supply through caramelization of the protein sources in shortening an enriched protein food source in a form of a roux base or flavor carrier powder material which provides a specific peak flavor. In fast food chains, such as Kentucky Fried Chicken, Grandy's and the like, gravies play a significant role in day-to-day food service. The present invention provides a method and a product which is suitable for providing gravies with specific flavors constituted from a source of an enhanced protein or protein concentrates which is a more desirable food for human consumption than for example any of the fast food starch base materials. These peak flavor protein roux based preparations allow the consumer or fast food operator to avoid cumbersome preparations of gravies from scratch in the restaurant or home by simply requiring hot or boiling water addition for creating the sauce or gravy. Thus, the present invention provides a one step gravy/sauce mixture or flavor carrier in which the desired gravy, sauce or carrier may be prepared from a protein source or concentrated protein source by the addition of the peak flavor protein roux base dry mix directly to boiling water.

The present invention also deals with the production of compositions capable of forming snack chips with definitive peak flavors such as fried flavors which are not fried or oil cooked in the preparation of the chip. The rouxs as discussed having peak flavor with correlatable colors to taste intensity can be mixed with various vegetable source materials such as masa and raw potato flake and the like in order to achieve an air baked chip having, for example, peak fried flavor of the roux constituent.

These rouxs can be prepared from various vegetable flour or particulate sources, for example, from masa, raw potato flakes, grain flours and the like. In addition, these snack chip compositions can be achieved having definitive fried flavors without being actually fried or oil cooked resulting in reduced oil content. The reduced oil content is achieved in two ways, reduction of the oil content of the original peak flavor roux for mixing with, for example, masa and then avoidance of flying the chips in oil. These combinations reduce substantially the amount of oil in the final chip product while maintaining the peak flavor of the roux which is generally a fried flavor. The fried flavor snack chip having reduced oil content as compared to commercially available fried chips is achieved through the reduction and avoidance of oil in the preparation of the chip. The roux definitive flavor is maintained even with the reduction of oil and the avoidance of preparing the chip by contact with cooking oils ie. air baking in an impingement oven.

DETAILED DESCRIPTION OF THE INVENTION

In accordance with the present invention, correlation of taste and color of the peak flavor protein roux base was discovered that allows a process and product having consistent taste. Since taste is something that is not physically measured by instrumentation and varies from palate to palate, the discovery of the food chemistry process of reaching a specified appropriate flavor as correlated to color code presents a significant advancement of the food chemistry and institutional food preparation services. The roux base in accordance with the invention is comprised of a mixture of protein sources and fats or shortenings. Namely, vegetable and animal proteins and an animal or vegetable fat or a blend is provided with the mixture of protein to fat ratio being variable from weight relationships of about 4:1 to about 1:4. A dry protein is mixed with the liquified shortening or oil or in the alternative, the mixture is preheated to 250° F. to drive off moisture that would be present in the protein and the mixture. The mixture is then heated to a temperature for a specific time period that corresponds to the desired flavor-color. The time requirement can vary depending upon the temperature range and the specific components. In general, the time will vary from about two minutes to about sixty minutes and more specifically, from about two minutes to about thirty minutes. The temperature can range from about 250° F. to about 475° F. again, depending on the nature of the oil and the protein or protein mixtures. The variation of time and temperature are viable and can be changed if the process is performed under pressure. The product that is produced is quenched in order to stop the caramelizing food chemistry reaction at the appropriate color-flavor determination. The quenching is accomplished by heat exchanger means and such quenching means can be tailored in order to allow the end product to be formed into pellets or thin flakes or in the case of vegetable oil, a fluid product. The product produced in this physical format, i.e., a dry format, allows for easy dispersion of the peak flavor protein roux base into a fluid comprised of water, milk or other cooking fluid materials to form a gravy mix or sauce. In addition, the roux base can be mixed into breading crumb and stuffing materials can be premixed as a combination package available for the end user or mixed by the user with customary bread crumbing and stuffing materials. In addition, the roux base can be mixed with typical packaged seasoning and breading products whether in particulate or dust form applications for use in microwave or conventional oven food preparation.

According to one embodiment of the invention, a predried protein is mixed on a one to one weight basis with soybean oil with constant mixing and heating conditions. The mixture reaches a specific fried flavor and color band when elevated to about 325°–400° F. When the temperature of about 400° F. is reached, the caramelizing protein soy oil product must be quickly quenched in order to stop the food chemistry caramelization reaction. Other oils, such as peanut oil, corn oil and the like will give different flavors under different conditions however, the flavors are also color related.

The fat that is used can be either animal or vegetable or a blend of both and can have a different level of saturation depending on the application for which the flavor component is desired. Fats of lower saturation will have less stability than those with more saturation. Antioxidant can be used to protect the fat from rancidity and would be added after heating but before final cooling. Variation of the saturation and fat type also enables the roux base to have a variety of melt characteristics and impact the release of flavor. Roux based produced products that are eaten at room temperature will require a fat that has a low saturation so that a waxy taste is not evident. A roux base of this type would be used as a component such as a dust or seasoning for snacks. Roux bases that are subjected to heating applications can be produced with higher melt fats.

Proteins constitute one of a class of complex nitrogenous compounds that occur naturally in plants and animals and yield amino acids when hydrolyzed. Proteins provide the amino acids essential for the growth and repair of animal tissue. Protein compositions are composed of carbon, hydrogen, oxygen, nitrogen, phosphorous, sulfur and iron which make up the greater part of plant and animal tissue. Amino acids represent the basic structure of proteins. Food containing protein consist of different numbers and kinds of amino acids. A complete protein is one that contains all of the essential amino acids (tryptophan, lysine, methionine, valine, leucine, isoleucine, phenylalanine, threonine, arginine and histidine). Proteins are necessary for growth and maintenance of body weight.

Sources of proteins include milk, eggs, cheese, meat, fish and some vegetables such as soybeans which are generally considered the best sources for protein food products. Proteins are found in both vegetable and animal sources of food. Many incomplete proteins are found in vegetables; they contain some of the essential amino acid groups but not all. A vegetarian diet can make up for this by combining vegetable groups that complement each other in their basic amino acid groups or by utilization of protein supplement foods. This combining of proteins provides the body with complete protein need.

Principal animal proteins are ovalbumin in eggs; lactalbumin in milk; serumalbumin in serum; myogen or myosiogen in striated muscle tissue; fiberinogen in blood; ovoglobulin in eggs; lactoglobulin milk; serum globulin in serum; myosin in striated muscle tissue; thyroglobulin in thyroid; globin in blood; thymus histones in thymus; collagen and gelatin in connective tissue; elastin; and keratin. Nucleoprotein is found in the thymus, pancreas, liver, animal cells, and glands; chondroprotein is found in tendons and cartilage; mucin and mucoids are found in various secreting glands and animal mucilaginous substances; caseinogen in milk; vitellin in egg yolk; hemoglobin in blood; and lecithoprotein in blood, brain and bile.

Proteins are a source of heat and energy to the body. They are essential for growth, the building of new tissue, and the repair of injured or broken-down tissue. They form an integral part of the protoplasm of every cell. When they are oxidized in the body, heat is liberated. One gram supplies 4 calories.

Infants and children require from 2 to 2.2 grams of protein per kilogram of body weight per day. This should be calculated on the basis of ideal, rather than actual, weight of the child. Age also is a factor in determining protein requirements, the amount decreasing with age. Physical work, menstruation, pregnancy, lactation, and convalescence require increased protein intake.

In the first step of the process for producing the protein roux base according to the invention, a shortening, preferably a vegetable oil type shortening is heated to a moltant condition and then the dried protein is added to the moltant shortening. In another embodiment, the protein source can be added to the moltant shortening and brought up to 200° to 250° for purposes of driving off any moisture in the protein or shortening. During the preheating of the protein and shortening for drying purposes the mixture is continuously agitated and mixed as well as during the heating for caramelization purposes which result in the roux base. Once the mixture is heated for a sufficient time and at a desired temperature to achieve a definitive color, the mixture is immediately quenched in order to abort the food chemistry reactions of caramelization and thus, preserve the desired flavor as indicated by color. Depending on the quench means by which the mixture is immediately cooled, flakes can be formed wherein the mix is applied either to a cooling roller or to a cooling belt from which the flakes are scraped.

The method for producing the roux base in accordance with the invention can include both batch and continuous means. The batch means includes a general pot approach of mixing and heating of the mixture under controlled conditions of temperature and time and equally important, controlled agitation in connection with the bottom areas of the container. The mixture requires agitation to reduce to a minimum the contact of the mixture ingredients with the bottom and sides of the container in order to avoid scorching exposure of the mixture at substantially elevated temperature. Production of the roux base in a continuous phase can be achieved through heated extruder means wherein the mixture is subjected to vigorous energized mixing and elevated temperatures under controlled conditions with the mixture being continuously fed to the heated extruder chamber and continuously removed therefrom to an immediate quenching zone.

Although final cooking of the mixture may be affected by any suitable means known in the art, the mixture may be quick chilled or quenched by pumping through a heat transfer means such as a scraped surface heat exchange apparatus to start crystallization of fat. Depending on the type of fat used, the cooled roux base assumes a somewhat plastic configuration and may be formed into flakes and/or granular like configurations. Cooling or quenching of the flowable mixture by pumping it through a heat transfer apparatus provides the advantage over certain prior art processes of continuous processing with attended economics and efficiency in energy expenditures.

Utilization of the various roux bases having definitive flavor color correlations in the preparation of reduced oil snack chips can be achieved by reducing the amount of oil in these rouxs. The oil removal from the peak flavor rouxs can be achieved by several means such as filtration ie. filter cake means; centrifuge means; dense gas solvents; and the like. Continuous feed centrifuge apparatus are really available in the marketplace which produce high G-force separations of the oil, caramelized food compositions. For example, a high capacity machine with a maximum g-force in excess of 3,000 g's is available which allows for the continuous discharge of solids and fluids from different portions of the centrifuge. These separations are achieved utilizing roux materials in accordance with the present invention having as high 80% oil content and the reduction being down to as low as about 10% by weight oil remaining in the roux which is in the solid discharge from the apparatus.

Other separation means are readily available and well-known in the art and include the utilization of dense gas solvent separations wherein the roux materials are introduced under pressure and mixed with these various dense gasses such as propane which when in the liquid form is an ideal solvent for the oils found in the roux material. Such processes allow continuous extraction of oil contents from the roux without solvent residue since propane is readily flashed from the roux solid or reduced oil roux by reduction of pressure. No matter the procedures utilized to reduce oil content of the rouxs, the reduced oil roux materials can be readily mixed with various vegetable sources including raw potato chip, masa and the like or mixtures of these materials and air baked in high air velocity impingement ovens achieving crisp snack chips with substantially reduced oil contents when compared to commercially available products in the marketplace. These oil reductions are achieved through actual removal of the oil from the roux as well as avoidance of cooking oils in preparing the final chip. Commercially available products such as Fritos and Doritos have typically 10 grams of oil per ounce of chip while products made in accordance with the present invention have from about 2 to about 5 grams of oil per ounce of chip.

Even with the reduced oil and air baking, the peak tried flavor roux carries the flavor to the chip and is comparible to other commercial (fried) chips. The reduced oil snack chips in accordance with the invention can also include from 1 to about 3 percent or greater by weight of herbs and spices for various consumer taste adjustments. Commonly used spices in food preparation such can be amenable for use in snack chip production include pepper, anise, cardamon, saffron, cumin, curry, paprika, mustard, tumeric, all spice and the like. Commonly utilized herbs by food preparers include basil, oregano, rosemary, sage, thyme, garlic, parsley, chive, bayleaf, tarragon and the like. However, the dominant feature of the snack chips having reduced oil content in accordance with the present invention is the accentuated fried flavor which is maintained by the roux even after reduction in the oil content. The fried flavor is focused in the reduced oil roux product.

The snack chip composition having peak fried flavor and reduced oil content can constitute a major component of a snack chip or a blend with other flavor enhancer components; starch sources, or protein sources. Snack chip compositions according to the invention can also be used as seasoning components for chips prepared by other methods.

Various people in the past have devised methods, often using complex formulas, for quantifying color and expressing it numerically with the aim of making it possible for anyone to communicate colors more easily and more accurately. These methods attempt to provide a way of expressing colors numerically, in much the same way that we express length or weight. For example, in 1905 the American artist A. H. Munsell devised a method for expressing colors which utilized a great number of paper color chips classified according to their hue (Munsell Hue), lightness (Munsell Value), and saturation (Munsell Chroma) for visual comparison with a specimen color. Other methods for expressing color numerically were developed by an international organization concerned with light and color, the Commission International de l'Eclairage (CIE). The two most widely known of these methods are the Yxy color space, devised in 1931 based on the tristimulus values XYZ defined by CIE, and the L*a*b* color space, devised in 1976 to provide more uniform color differences in relation to visual differences. *Color space: method for expressing the color of an object or a light source using some kind of notation, such as numbers. Color spaces such as these are now used throughout the world for color communication.

The L*a*b* color space, also referred to as CIELAB, is presently one of the most popular color space for measuring object color and is widely used in virtually all fields. It is one of the uniform color spaces defined by CIE in 1976 in order to reduce one of the major problems of the original Yxy color space: that equal distances on the x, y chromaticity diagram did not correspond to equal perceived color differences. In this color space, L* indicates lightness and a* and b* are the chromaticity coordinates. The Hunter Lab color space was developed in 1948 by R. S. Hunter as a uniform color space which could be read directly from a photoelectric colorimeter (tristimulus method). Values in this color space are defined by the following formulas:

$$L = 100 \sqrt{\frac{Y}{Y_0}}$$

$$a = 175 \sqrt{\frac{0.0102 X_0}{(Y/Y_0)}} \cdot \left[ \left(\frac{X}{X_0}\right) - \left(\frac{Y}{Y_0}\right) \right]$$

$$b = 70 \sqrt{\frac{0.00847 Z_0}{(Y/Y_0)}} \cdot \left[ \left(\frac{Y}{Y_0}\right) - \left(\frac{Z}{Z_0}\right) \right]$$

where

X, Y, Z: Tristimulus values of the specimen ($X_{10}$, $Y_{10}$, $Z_{10}$ tristimulus values can also be used.) $X_0$, $Y_0$, $Z_0$: Tristimulus values of the perfect reflecting diffuser For the 2° Standard Observer and Standard Illuminant C, the above equations would become:

$$L = 100 \sqrt{Y}$$

$$a = \frac{1.75 (1.02X - Y)}{\sqrt{Y}}$$

$$b = \frac{7.0 (Y - 0.847Z)}{\sqrt{Y}}$$

Color difference $\Delta E_H$ in the Hunter Lab color space, which indicates the degree of color difference but not the direction, is defined by the following equation:

$$\Delta E_H = \sqrt{(\Delta L)^2 + (\Delta a)^2 + (\Delta b)^2}$$

where $\Delta L$, $\Delta a$, $\Delta b$: Difference in L, a, and b values between the specimen color and the target color The L*a*b* color space, also referred to as the CIELAB space, is one of the uniform color spaces defined by the CIE in 1976. The values of L*, a* and b* are calculated according to the formulas below:

Lightness variable L*:

$$L^* = 116 \left(\frac{Y}{Y_n}\right)^{1/3} - 16$$

Chromaticity coordinates a* and b*:

$$a^* = 500 \left[ \left(\frac{X}{X_n}\right)^{1/3} - \left(\frac{Y}{Y_n}\right)^{1/3} \right]$$

-continued
$$b^* = 200 \left[ \left(\frac{Y}{Y_n}\right)^{1/3} - \left(\frac{Z}{Z_n}\right)^{1/3} \right]$$

where

X, Y, Z: Tristimulus values XYZ for 2° Standard Observer) or $X_{10}Y_{10}Z_{10}$ (for 10° Supplementary Standard Observer) of the specimen $X_n$, $Y_n$, $Z_n$: Tristimulus values XYZ (for 2° Standard Observer) or $X_{10}Y_{10}Z_{10}$ (for 10° Supplementary Standard Observer) of a perfect reflecting diffuser.

If X/Xn, Y/Yn, or Z/Zn is less than 0.008856, the above equations are changed as described below:

$$\left(\frac{X}{Xn}\right)^{1/3} \text{ is replaced by } 7.787 \left(\frac{X}{Xn}\right) + \frac{16}{116}$$

$$\left(\frac{Y}{Yn}\right)^{1/3} \text{ is replaced by } 7.787 \left(\frac{Y}{Yn}\right) + \frac{16}{116}$$

$$\left(\frac{Z}{Zn}\right)^{1/3} \text{ is replaced by } 7.787 \left(\frac{Z}{Zn}\right) + \frac{16}{116}$$

As used in the following examples and claims color difference. $\Delta E^*_{ab}$ in the L*a*b* color space, which indicates the degree of color difference but not the direction, is defined by the following equation:

$$\Delta E^*_{ab} = \sqrt{(\Delta L^*)^2 + (\Delta a^*)^2 + (\Delta b^*)^2}$$

where $\Delta L^*$, $\Delta a^*$, $\Delta b^*$: Difference in L*, a* and b* values between the specimen color and the target color.

In order to more clearly describe the nature of the present invention, specific examples will hereinafter be described. It should be understood, however, that this is done solely by way of example and is intended neither to delineate the scope of the invention or limit the ambient of the appended claims. In the examples and throughout the specification, percentages referred to percent by weight are based on the weight of the final product unless otherwise specified.

EXAMPLE 1

WHEAT GLUTEN

The following Protein Roux experiments and the resulting color and temperature measurements were made with the following equipment.

Color: Minolta Model CR-300 Chroma Meter. Color measurements expressed in the *L*b*a color space as defined by CIE in 1976.

Temperature: Fluke Model 51 digital thermometer.

1. Equal amounts of soybean oil and Wheat Gluten powder were combined forming a roux. Gluten is defined as vegetable albumin, a protein that can be prepared from wheat and other grain. The Wheat Gluten used in this example was supplied by Midwest Grain Products Inc., 1300 Main, Atchison, Kans. 66002. The roux was mixed thoroughly in a medium saucepan. Sample 1 was taken.
2. Medium heat and constant agitation was applied to the roux. After 3 minutes Sample 2 was taken.
3. After 6 minutes Sample 3 was taken.
4. After 9 minutes Sample 4 was taken.

The following data was derived from this experiment:

| | | Wheat Gluten Roux | | |
|---|---|---|---|---|
| Sample # | Time | Temp | Raw Data | Delta E |
| 1 | 0 min | 180° F. | L* 52.88<br>a* −.72<br>b* 17.59 | ΔL* −44.76<br>Δa* .07<br>Δb* 14.87<br>ΔE* 47.16 |
| 2 | 3 min | 280° F. | L* 52.27<br>a* 2.74<br>b* 22.92 | ΔL* −45.37<br>Δa* 3.53<br>Δb* 20.20<br>ΔE* 49.78 |
| 3 | 6 min | 360° F. | L* 45.02<br>a* 9.20<br>b* 24.80 | ΔL* −52.62<br>Δa* 9.99<br>Δb* 22.08<br>ΔE* 57.93 |
| 4 | 9 min | 398° F. | L* 39.23<br>a* 11.11<br>b* 23.44 | ΔL* −58.41<br>Δa* 11.90<br>Δb* 20.72<br>ΔE* 63.10 |

ΔE* compiled number was determined using a target color from a Minolta white calibration standard with the following values:
L* 97.55
a* −.77
b* 2.73

EXAMPLE 2

ISOLATED SOY PROTEIN

The following Protein Roux experiments and the resulting color and temperature measurements were made with the following equipment.

Color: Minolta Model CR-300 Chroma Meter. Color measurements expressed in the *L*b*a color space as defined by CIE in 1976.

Temperature: Fluke Model 51 digital thermometer.

1. A mixture of 75 % soybean oil and 25 % Isolated Soy Protein, supplied by Midwest Grain Products Inc., 1300 Main, Atchison, Kans. 66002, were combined forming a roux. The roux was mixed thoroughly in a medium saucepan. Sample 1 was taken.
2. Medium heat and constant agitation was applied to the roux. After 3 minutes Sample 2 was taken.
3. After 6 minutes Sample 3 was taken.
4. After 9 minutes Sample 4 was taken.

The following data was derived from this experiment:

| | | Isolated Soy Protein Roux | | |
|---|---|---|---|---|
| Sample # | Time | Temp | Raw Data | Delta E |
| 1 | 0 min | 130° F. | L* 78.33<br>a* −1.52<br>b* 21.44 | ΔL* −19.31<br>Δa* 2.31<br>Δb* 18.72<br>ΔE* 26.99 |
| 2 | 3 min | 240° F. | L* 74.00<br>a* .26<br>b* 22.38 | ΔL* −23.64<br>Δa* 1.05<br>Δb* 19.66<br>ΔE* 30.76 |
| 3 | 6 min | 310° F. | L* 72.26<br>a* .50<br>b* 24.13 | ΔL* −25.38<br>Δa* 1.29<br>Δb* 21.41<br>ΔE* 33.22 |
| 4 | 9 min | 340° F. | L* 71.36<br>a* 1.61<br>b* 26.28 | ΔL* −26.28<br>Δa* 2.40<br>Δb* 23.56<br>ΔE* 35.37 |

| | | Isolated Soy Protein Roux | | |
|---|---|---|---|---|
| Sample # | Time | Temp | Raw Data | Delta E |

ΔE* compiled number was determined using a target color from a Minolta white calibration standard with the following values:
L* 97.55
a* −.77
b* 2.73

EXAMPLE 3

CHEESE POWDER

The following Cheese Roux experiments and the resulting color and temperature measurements were made with the following equipment.

Color: Minolta Model CR-300 Chroma Meter. Color measurements expressed in the *L*b*a color space as defined by CIE in 1976.

Temperature: Fluke Model 51 digital thermometer.

1. Equal amounts of soybean oil and Kraft brand Uncolored Cheeztang* were combined forming a roux. The roux was mixed thoroughly in a medium saucepan. Sample 1 was taken.

*Uncolored Cheeztang is a commercially available and widely known powdered cheese manufactured by Kraft, Inc. The ingredient statement from Kraft, Inc. lists the following ingredients: A dehydrated blend of Cheddar Cheese (Milk, Cheese Culture, salt, enzymes), Cram, Salt, Sodium Phosphate, Lactic Acid).

2. Medium heat and constant agitation was applied to the roux. After 3 minutes Sample 2 was taken.
3. After 6 minutes Sample 3 was taken.
4. After 9 minutes Sample 4 was taken.

The following data was derived from this experiment:

| | | Natural Cheese Roux | | |
|---|---|---|---|---|
| Sample # | Time | Temp | Raw Data | Delta E |
| 1 | 0 min | 130° F. | L* 84.63<br>a* −4.96<br>b* 17.01 | ΔL* −13.01<br>Δa* −4.17<br>Δb* 14.29<br>ΔE* 19.77 |
| 2 | 3 min | 240° F. | L* 81.40<br>a* .41<br>b* 25.34 | ΔL* −16.21<br>Δa* 1.20<br>Δb* 22.62<br>ΔE* 27.87 |
| 3 | 6 min | 270° F. | L* 64.81<br>a* 12.47<br>b* 35.13 | ΔL* −32.83<br>Δa* 13.26<br>Δb* 32.41<br>ΔE* 48.00 |
| 4 | 9 min | 320° F. | L* 53.94<br>a* 13.77<br>b* 31.39 | ΔL* −43.70<br>Δa* 14.56<br>Δb* 28.67<br>ΔE* 54.25 |

ΔE* compiled number was determined using a target color from a Minolta white calibration standard with the following values:
L* 97.55
a* −.77
b* 2.73

EXAMPLE 4

WHOLE EGG POWDER

The following Protein Roux experiments and the resulting color and temperature measurements were made with the following equipment.

Color: Minolta Model CR-300 Chroma Meter. Color measurements expressed in the *L*b*a color space as defined by CIE in 1976.

Temperature: Fluke Model 51 digital thermometer.

1. Equal amounts of soybean oil and Whole Egg Powder supplied by Monark Egg Corp., 601 East Third Street, Kansas City, Mo. 64106, were combined forming a roux. The roux was mixed thoroughly in a medium saucepan. Sample 1 was taken.
2. Medium heat and constant agitation was applied to the roux. After 3 minutes Sample 2 was taken.
3. After 6 minutes Sample 3 was taken.
4. After 9 minutes Sample 4 was taken.

The following data was derived from this experiment:

| Whole Egg Powder Roux | | | | |
|---|---|---|---|---|
| Sample # | Time | Temp | Raw Data | Delta E |
| 1 | 0 min | 130° F. | L* 77.05 | ΔL* −20.59 |
| | | | a* 5.26 | Δa* 6.05 |
| | | | b* 39.27 | Δb* 36.55 |
| | | | | ΔE* 42.38 |
| 2 | 3 min | 240° F. | L* 69.92 | ΔL* −27.72 |
| | | | a* 7.33 | Δa* 8.12 |
| | | | b* 41.18 | Δb* 38.46 |
| | | | | ΔE* 48.09 |
| 3 | 6 min | 275° F. | L* 59.87 | ΔL* −37.77 |
| | | | a* 10.58 | Δa* 11.37 |
| | | | b* 34.83 | Δb* 32.11 |
| | | | | ΔE* 50.86 |
| 4 | 9 min | 360° F. | L* 53.58 | ΔL* −44.06 |
| | | | a* 10.97 | Δa* 11.76 |
| | | | b* 29.72 | Δb* 27.00 |
| | | | | ΔE* 52.99 |

ΔE* compiled number was determined using a target color from a Minolta white calibration standard with the following values:
L* 97.55
a* −.77
b* 2.73

EXAMPLE 5

SPRAY DRIED CHICKEN MEAT

The following Protein Roux experiments and the resulting color and temperature measurements were made with the following equipment.

Color: Minolta Model CR-300 Chroma Meter. Color measurements expressed in the *L*b*a color space as defined by CIE in 1976.

Temperature: Fluke Model 51 digital thermometer.

1. Equal amounts of soybean oil and Spray Dried Chicken Meat* were combined forming a roux. The roux was mixed thoroughly in a medium saucepan. Sample 1 was taken.

*The Spray Dried Chicken Meat product used was Kerry Ingredients/Beatreme 3757, Kerry Ingredients, 352 East Grand Avenue, Beloit, Wis. 53511.

2. Medium heat and constant agitation was applied to the roux. After 4 minutes Sample 2 was taken.
3. After 8 minutes Sample 3 was taken.
4. After 12 minutes Sample 4 was taken.
5. After 15 minutes Sample 5 was taken.

The following data was derived from this experiment:

| Spray Dried Chicken Meat Roux | | | | |
|---|---|---|---|---|
| Sample # | Time | Temp | Raw Data | Delta E |
| 1 | 0 min | 140° F. | L* 48.64 | ΔL* −49.00 |
| | | | a* 4.60 | Δa* 5.39 |
| | | | b* 18.03 | Δb* 15.31 |
| | | | | ΔE* 51.61 |
| 2 | 4 min | 251° F. | L* 46.91 | ΔL* −50.73 |
| | | | a* 3.74 | Δa* 4.53 |
| | | | b* 15.46 | Δb* 12.74 |
| | | | | ΔE* 52.50 |
| 3 | 8 min | 375° F. | L* 47.33 | ΔL* −50.31 |
| | | | a* 4.68 | Δa* 5.47 |
| | | | b* 18.68 | Δb* 15.96 |
| | | | | ΔE* 53.06 |
| 4 | 12 min | 420° F. | L* 45.39 | ΔL* −52.55 |
| | | | a* 9.09 | Δa* 9.88 |
| | | | b* 23.39 | Δb* 20.67 |
| | | | | ΔE* 57.05 |
| 5 | 15 min | 441° F. | L* 37.87 | ΔL* −59.77 |
| | | | a* 11.43 | Δa* 12.22 |
| | | | b* 22.05 | Δb* 19.33 |
| | | | | ΔE* 63.99 |

ΔE* compiled number was determined using a target color from a Minolta white calibration standard with the following values:
L* 97.55
a* −.77
b* 2.73

The following examples, Example 6 and 7 illustrate a snack chip composition preparation wherein the composition has a reduced oil content. The examples also provide for the preparation of a snack chip with reduced oil content.

EXAMPLE 6

This example illustrates one embodiment of the present process and the fried flavor, reduced oil snack chip produced thereby.

The process begins with two ingredients, dried masa and a partially hydrogentated soy bean oil more specifically described as 100% soy bean oil that is superhydrogenated so that the resulting shortening contains a minimum of 65 % solids and the melting point of the resulting shortening is 112° F. or higher constitutes the second ingredient. Even though the resulting shortening is very stable, it is anticipated that antioxidants will be incorporated in the process at a level of approximately 200 ppm.

The two ingredients are measured out in for example, equal amounts by weight. The mixture was prepared using 500 grams of each ingredient for a total finished product of 1,000 grams. First, the shortening component was placed in a heavy gauge cooking vessel approximately 10.5 inches in diameter and 2 inches deep. The shortening was then melted and brought to a temperature of 200° F. by placing the cooking vessel on a standard stovetop burner on a medium heat setting. The masa was then incorporated with the shortening and thoroughly mixed until no lumps of flour remain. The mixing was done with an electric hand-held single beater mixer attached to a special springlike wire mixing and scraping attachment. When the two ingredients were thoroughly mixed, the temperature was raised to a high setting and achieved approximately 400° F. The mixture was cooked at the 400° F. while constantly being mixed and the vessel being scraped with the springlike wire mixing and scraping attachment. The cooking extended through twenty minutes of cooking and agitating with the mixture going through various stages of caramelization. In other words, the visible appearance of the cooking product changed from an off-white in the beginning through many shades of reddish-browns. Furthermore, during the cooking process the color changes occurred at more rapid rates as the temperature of the product was elevated. By the time the product reached 400° F. the product was reacting and changing very rapidly for example, changing from a slightly thick texture to a very thick texture (similar to the appearance of melted chocolate). About 20 minutes into the process, the reaction was halted in order to arrive at the proper useful color which in turn, provided a particular fried flavor. As soon as the product reached a specific Delta E, the mixture was immediately cooled to 200° F. which stopped the majority of the in progress reaction and preserved the proper color which in turn, preserved the proper fried flavor.

Prior to beginning of the cook, a cooling vessel was prepared that consisted of a rectangular corning ware baking dish of 12"×7.5"×2". The corning ware dish was placed in another metal baking pan 13"×9"×2" which was 75% filled with ice and water. The cooking reaction product was immediately removed from the stovetop and hastily poured into the cooking vessel which was at approximately 30° F. The product was agitated and mixed during the cooking cycle until the product reached a temperature of 200° F. The product was then allowed to rest until a temperature of 150° F. was achieved at which time, the product was again agitated and mixed back to a homogenous state. During the cooling period the oil has a tendency to separate from the now caramelized flour. As soon as the product temperature fell below the melting point of the shortening at approximately 112° F. the product solidified.

The roux was processed through a centrifuge means for removing of a substantial portion of the oil down to about 10% by weight. This reduced oil roux having a definitive fried flavor as correlatable to the Delta E was then mixed with equal amount of masa. Masa being defined as a moist mash resulting from the grinding of corn soaked in lime and water solution and used in preparing tortillas and tamales and other Latin American foods. With the accelerating growth of consumption of tortilla chips and corn chips all over the world, utilization of masa in salted and other snack chips has become the basis for a significant consumer product. The mixture of the oil reduced roux and masa was formed into a sheet like layer and introduced into an impingement oven with temperatures of from about 300° F. to 450° F. for a sufficient time for the sheet material to become crisp as would be expected of a commercially available chip. The resulting chip maintained the fried flavor of the original roux before reduction of oil content and mixture with masa. The reduced oil snack chip or salt snack chip carries forth the dominant fried flavor of the roux without cooking the chip in oil ie. the utilization of an air bake impingement oven.

EXAMPLE 7

This example illustrates one embodiment of the present process and the fried flavor, reduced oil snack chip produced thereby.

The process begins with two ingredients. Dried raw potato flakes and a partially hydrogenated soy bean oil more specifically described as 100% soy bean oil that is super-hydrogenated so that the resulting shortening contains a minimum of 65 % solids and the melting point of the resulting shortening is 112° F. or higher constitutes the second ingredient. Even though the resulting shortening is very stable, it is anticipated that antioxidants will be incorporated in the process at a level of approximately 200 ppm.

The two ingredients are measured out in for example, equal amounts by weight. The mixture was prepared using 500 grams of each ingredient for a total finished product of 1,000 grams. First, the shortening component was placed in a heavy gauge cooking vessel approximately 10.5 inches in diameter and 2 inches deep. The shortening was then melted and brought to a temperature of 200° F. by placing the cooking vessel on a standard stovetop burner on a medium heat setting. The flakes were then incorporated with the shortening and thoroughly mixed until no lumps of flour remain. The mixing was done with an electric hand-held single beater mixer attached to a special springlike wire mixing and scraping attachment. When the two ingredients were thoroughly mixed, the temperature was raised to a high setting and achieved approximately 400° F. The mixture was cooked at the 400° F. while constantly being mixed and the vessel being scraped with the springlike wire mixing and scraping attachment. The cooking extended through ten minutes of cooking and agitating with the mixture going through various stages of caramelization. In other words, the visible appearance of the cooking product changed from an off-white in the beginning through many shades of reddish-browns. Furthermore, during the cooking process the color changes occurred at more rapid rates as the temperature of the product was elevated. By the time the product reached 400° F. the product was reacting and changing very rapidly for example, changing from a slightly thick texture to a very thick texture (similar to the appearance of melted chocolate). About ten minutes into the process, the reaction was halted in order to arrive at the proper useful color which in turn, provided a particular fried flavor. As soon as the product reached a specific Delta E, the mixture was immediately cooled to 200° F. which stopped the majority of the in progress reaction and preserved the proper color which in turn, preserved the proper fried flavor.

The roux of was subjected to oil reduction through centrifugal means achieving an oil content of about 10% by weight. This reduced oil roux was then thoroughly mixed with masa and introduced into an air bake impingement oven at temperatures of from about 300° F. to 450° F. again for sufficient time for the sheet material to formulate a crisp chip consistency.

Both the chips of Examples 6 and 7 can be flavor enhanced by various herbs and spices depending on the snack chip market direction of the product.

The terms and expressions which have been employed or used as terms of description and not of limitation, and it is not intended in the use of such terms and expressions to exclude an equivalence of the features shown and described or portions thereof, since it is recognized that various modifications are possible within the scope of the invention claimed.

What is claimed is:

1. A reduced oil protein roux having a peak flavor comprised of a caramelized protein source and shortening mixture having a ratio of about 80:20 to about 20:80 percent by weight of protein source to shortening, the roux exhibiting a peak flavor correlatable to a specific $\Delta E^*ab$, the $\Delta E^*ab = \sqrt{(\Delta L^*)^2 + (\Delta a^*)^2 + (\Delta b^*)^2}$, indicating a degree of color difference in a $L^*a^*b^*$ color space, the $\Delta E^*ab$ color in the range of from about 25 to about 65 as a result of heating, mixing, caramelizing and quenching of the caramelized mixture; the the roux having the shortening content reduced to about 10% by weight or greater;

the reduced oil peak flavor protein roux having a reduced $\Delta E^*ab$ indicating a degree of color difference in the L\*a\*b\* color space, the reduced ΔE\*ab color being the result of the absence of extracted oil; and retention of the peak flavor is in the protein roux powder; and the peak flavor of the protein roux powder is correlatable to a specific ΔE\*ab.

2. The protein roux according to claim 33 wherein the protein source is comprised of grain protein and the roux ΔE\*ab color is in the range of from about 48 to about 65.

3. The protein roux according to claim 2 wherein the grain protein is comprised of wheat gluten.

4. The protein roux according to claim 1 wherein the protein source is comprised of vegetable protein the roux ΔE\*ab ranges from about 28 to 38.

5. The protein roux according to claim 4 wherein the vegetable protein is comprised of isolated soy protein.

6. The protein roux according to claim 1 wherein the protein source is comprised of dairy protein and the roux ΔE\*ab color ranges from about 25 to about 60.

7. The protein roux according to claim 6 wherein the dairy protein is comprised of powdered cheese.

8. The protein roux according to claim 1 wherein the protein source is comprised of animal protein.

9. The protein roux according to claim 8 wherein the animal protein is comprised of spray dried beef protein.

10. The protein roux according to claim 8 wherein the animal protein is comprised of spray dried pork protein.

11. The protein roux according to claim 1 wherein the protein source is whole egg powder and the roux ΔE\*ab color ranges from about 44 to about 55.

12. The protein roux according to claim 1 wherein the protein source is comprised of spray dried chicken meat and the roux ΔE\*ab color ranges from about 50 to 65.

13. The protein roux according to claim 1 wherein the protein source is comprised of dried fish products.

14. A snack chip composition having a peak flavor comprised of a caramelized first vegetable flour or particulate source and shortening mixture having a ratio of about 80:20 to about 20:80 percent by weight of vegetable source to shortening, the roux exhibiting a peak flavor correlatable to a specific ΔE color in the range of from about 25 to about 65 as a result of heating, mixing, caramelizing and quenching of the mixture;

the roux having the shortening content reduced to about 10 percent by weight or greater mixed with from about 5 percent by weight to about 60 percent by weight of a second flour or particulate vegetable source of the same or different vegetable which when air baked produces snack chips with the peak flavor of the roux.

15. The snack chip composition according to claim 14 wherein the vegetable source is comprised of masa.

16. The snack chip composition according to claim 14 wherein the vegetable source is comprised of raw potato flakes.

17. The snack chip composition according to claim 14 wherein the vegetable source is comprised of a mixture of masa and raw potato flakes.

18. The snack chip composition according to claim 14 wherein the snack chip composition with the peak flavor of the roux is further flavor enhanced by from about 1 to about 3 percent by weight of various herbs and spices.

19. The snack chip composition according to claim 14 wherein the composition is comprised of from about 30 to about 90 percent by weight of masa and the snack chip composition has a fried peak flavor.

20. A fried flavor snack chip having reduced shortening content comprised of a caramelized first vegetable source and shortening mixture having a ratio of about 80:20 to about 20:80 percent by weight protein source to shortening, the protein roux exhibiting a fried peak flavor which is correlatable to a specific ΔE color in the range of from about 25 to about 65 as a result of heating, mixing, caramelizing and quenching of the mixture;

the roux having the shortening content reduced to about 10 percent by weight or greater mixed with about 5 percent by weight to about 60 percent by weight of a second flour or particulate vegetable source which when air baked produces the snack chip with the fried peak flavor of the roux.

21. The fried flavor snack chip having reduced oil content according to claim 20 wherein the second flour or particulate vegetable source is comprised of masa.

22. The fried flavor snack chip having reduced oil content according to claim 20 wherein the first flour or particulate vegetable source is comprised of raw potato flakes.

23. The fried flavor snack chip having reduced oil content according to claim 20 wherein the first and second flour or particulate vegetable sources are comprised of a mixture of masa and raw potato flakes.

24. The fried flavor snack chip having reduced oil content according to claim 20 wherein the chip is comprised of from about 1 to about 3 weight percent of various herbs and spices which enhance the fried flavor peak of the chip.

25. The fried flavor snack chip having reduced oil content according to claim 20 wherein both the first and second vegetable source are comprised of masa.

26. A method for preparing fried flavor snack chips having reduced oil content comprising:

caramelizing a first flour or particulate vegetable source and shortening mixture having a ratio of about 80:20 to about 20:80 percent by weight of protein source to shortening;

quenching the carmelization of the mixture when the mixture exhibits a ΔE color range of from about 25 to about 65, the color being correlatable to the fried flavor;

reducing the oil content of the caramelized mixture to as low as 10 percent by weight;

mixing the reduced oil caramelized roux with from about 5 percent by weight to about 60 percent by weight of a second flour or particulate vegetable source; and air baking the mixture for sufficient periods to form a crispy fried flavor reduced oil chip.

27. The process according to claim 26 wherein the air baking is achieved with high velocity air impingement oven baking at temperatures of from about 400° F. to about 450° F.

28. The process for producing reduced oil fried flavor snack chips according to claim 26 wherein the oil of the fried flavor caramelized roux is removed through centrifugal means.

29. The method for producing reduced oil fried flavor snack chips according to claim 26 wherein the caramelized roux oil content is removed through dense gas extraction means.

30. A protein enriched food product flavor carrier comprised of a protein roux of a caramelized protein source and shortening having a ratio of about 80:20 to about 20:80 percent by weight of protein source to shortening, the protein roux exhibiting a peak flavor;

the protein roux exhibiting a peak flavor correlatable to a specific ΔE\*ab, the $\Delta E^*ab = \sqrt{(\Delta L^*)^2 + (\Delta a^*)^2 + (\Delta b^*)^2}$, indicating a degree of color difference in a L\*a\*b\* color space, the ΔE\*ab color in the range of from about 25 to about 65 as a result of heating, mixing caramelizing and quenching of the caramelized mixture;

the roux having the shortening content reduced to about 90:10 to about 80:20 percent by weight of protein source to shortening;

the reduced oil protein enriched food product flavor carrier having a reduced $\Delta E^*ab$ indicating a degree of color difference in the $L^*a^*b^*$ color space, the reduced $\Delta E^*ab$ color being the result of the absence of extracted oil;

retention of the peak flavor of the protein enriched food product flavor carrier is in the protein roux powder; and the peak flavor of the protein enriched food product flavor carrier, protein roux powder is correlatable to a specific $\Delta E^*ab$.

* * * * *